(12) United States Patent
Narayanan et al.

(10) Patent No.: US 7,834,281 B2
(45) Date of Patent: Nov. 16, 2010

(54) DRAW OUT CIRCUIT BREAKER ASSEMBLY HAVING A TELESCOPIC RACKING HANDLE

(75) Inventors: Janakiraman Narayanan, Andra Pradesh (IN); Soundararajan Narayanasamy, Hyderabad (IN); Amit Bose, Secunderabad (IN); Partha Sarathy Doddapadam Srinivasa Raghavachar, Karnataka (IN); Wolfgang Meyer-Haack, Neumunster (DE)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 12/103,077

(22) Filed: Apr. 15, 2008

(65) Prior Publication Data

US 2009/0255789 A1 Oct. 15, 2009

(51) Int. Cl.
*H01H 9/20* (2006.01)

(52) U.S. Cl. .................................. 200/50.21; 200/50.24
(58) Field of Classification Search ............... 200/50.21, 200/50.24
See application file for complete search history.

(56) References Cited

U.S. PATENT DOCUMENTS 7,582,837 B2 * 9/2009 Lyu et al. ................. 200/50.21
2009/0173604 A1 * 7/2009 Kozar et al. ............... 200/50.02

* cited by examiner

*Primary Examiner*—Renee Luebke
*Assistant Examiner*—Lisa Klaus
(74) *Attorney, Agent, or Firm*—Global Patent Operation; Stephen G. Midgley (57) ABSTRACT

A draw out circuit breaker assembly which includes a draw out circuit breaker having a plurality of contacts configured for connecting and disconnecting an electrical power source to an electrical load, a breaker cassette including a draw out support plate housing operational components of the draw out circuit breaker, and a port, and a collapsible telescopic racking handle stored collapsed in the port after the draw out circuit breaker is racked into the breaker cassette.

15 Claims, 9 Drawing Sheets

DRAW OUT CIRCUIT BREAKER ASSEMBLY HAVING A TELESCOPIC RACKING HANDLE

BACKGROUND

This invention relates to circuit breakers. More particularly, this invention relates to a draw out air circuit breaker assembly having a telescopic racking handle.

Generally, an air circuit breaker includes mechanical operating components that are mainly exposed to the environment. The air circuit breaker includes a main contact which is either opened to interrupt a path for electrical power traveling from an electrical power source to a load or closed to provide a path for the power to travel from the source to the load and disposed in a plastic housing. Arc chambers are disposed in the said housing are used for extinguishing an arc generated while opening and closing the contacts. The draw out type air breaker is movable to be separated from the power source and the load circuit in order to facilitate maintenance.

The draw out air circuit breaker includes a racking handle for racking the circuit breaker into and out of a breaker cassette. The racking handle is utilized for racking the circuit breaker into the breaker cassette and is then stored. There are several disadvantages associated with the conventional racking handle of the draw out air circuit breakers. One disadvantage is that the storage space in the breaker cassette for the racking handle is limited due to interference with other moving or stationary parts. Another disadvantage is that it is difficult to rack higher ampere rated frames using the conventional racking handle due to the number of primary disconnect contacts increasing with ampere rating, and the external force required to be applied during a rack-in operation. Thus, it would be desirable to have a racking handle which can be easily stored upon racking the circuit breaker and which includes a larger mechanical advantage to enable ease in racking higher frames.

BRIEF DESCRIPTION

An exemplary embodiment of the present invention provides a draw out circuit breaker assembly. The draw out circuit breaker assembly includes a draw out circuit breaker having a plurality of contacts configured for connecting and disconnecting an electrical power source to an electrical load, a breaker cassette including a draw out support plate housing operational components of the draw out circuit breaker, and a port, and a collapsible telescopic racking handle stored collapsed in the port after the draw out circuit breaker is racked into the breaker cassette.

Another exemplary embodiment of the present invention provides a method for racking a draw out circuit breaker into and out of a breaker cassette. The method includes removing a collapsible telescopic racking handle from a port in the breaker cassette, folding the collapsible telescopic racking handle into a Z-shape, engaging a racking shaft arm of the collapsible telescopic racking handle with a racking shaft of the breaker cassette, racking the draw out circuit breaker into and out of the breaker cassette, and collapsing the collapsible telescopic racking handle for storage thereof in the port.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION

Figure 1:
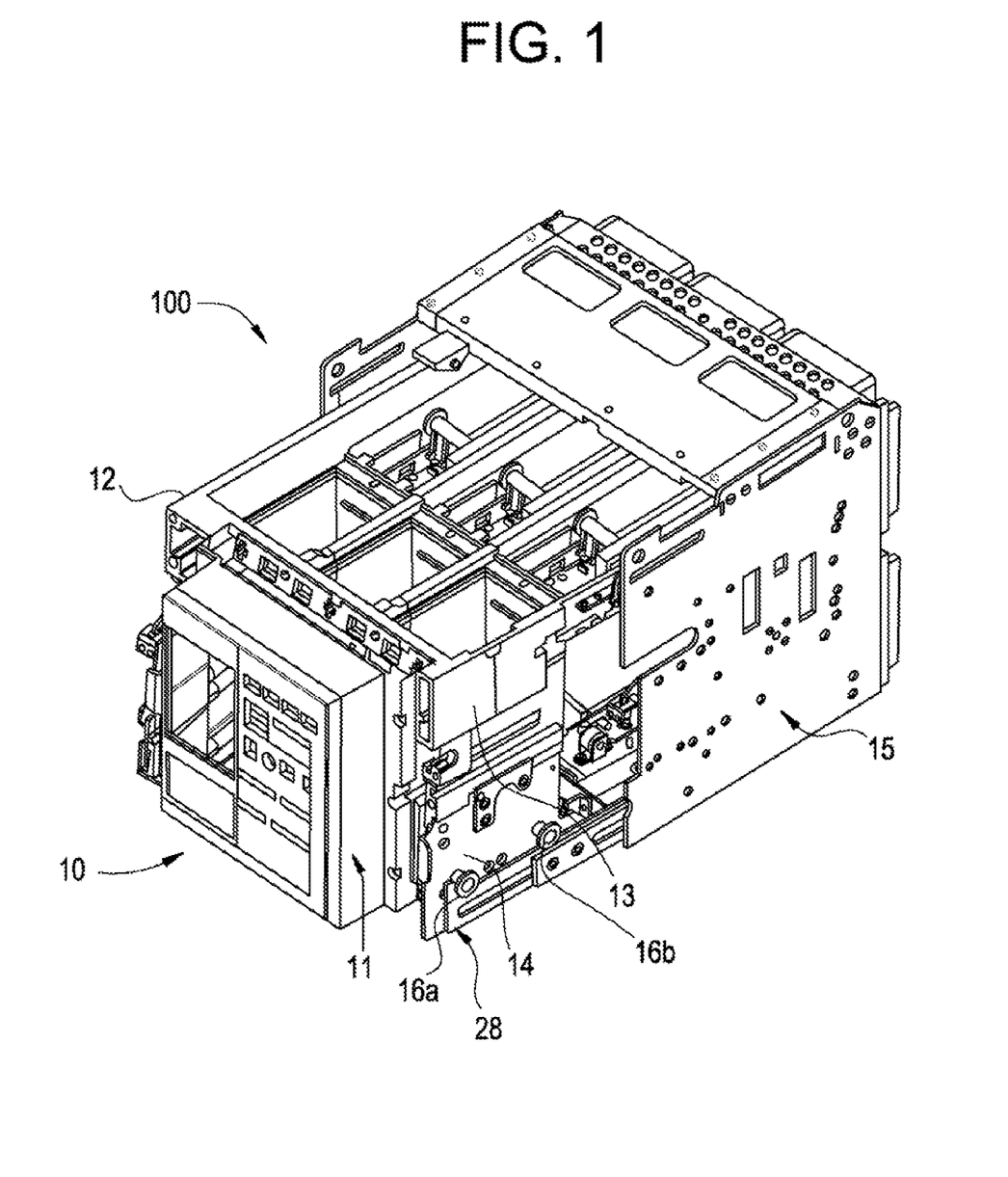
FIG. 1 is a right perspective view of a draw out circuit breaker assembly that can be implemented within embodiments of the present invention

Turning now to the drawings in greater detail, it will be seen that in FIG. 1, there is a draw out air circuit breaker assembly 100 which includes a draw out circuit breaker 10 and a breaker cassette 15. The draw out circuit breaker 10 includes a main body 11 and side portions 12 and 13. Further, the circuit breaker 10 includes a mounting plate 14 at the side portion 13, the mounting plate including glide members 16a and 16b and is mounted on support railings 28 of a draw out support plate 20 (depicted in FIG. 3). The circuit breaker 10 is positioned to be racked in the breaker cassette 15.

Figure 2:
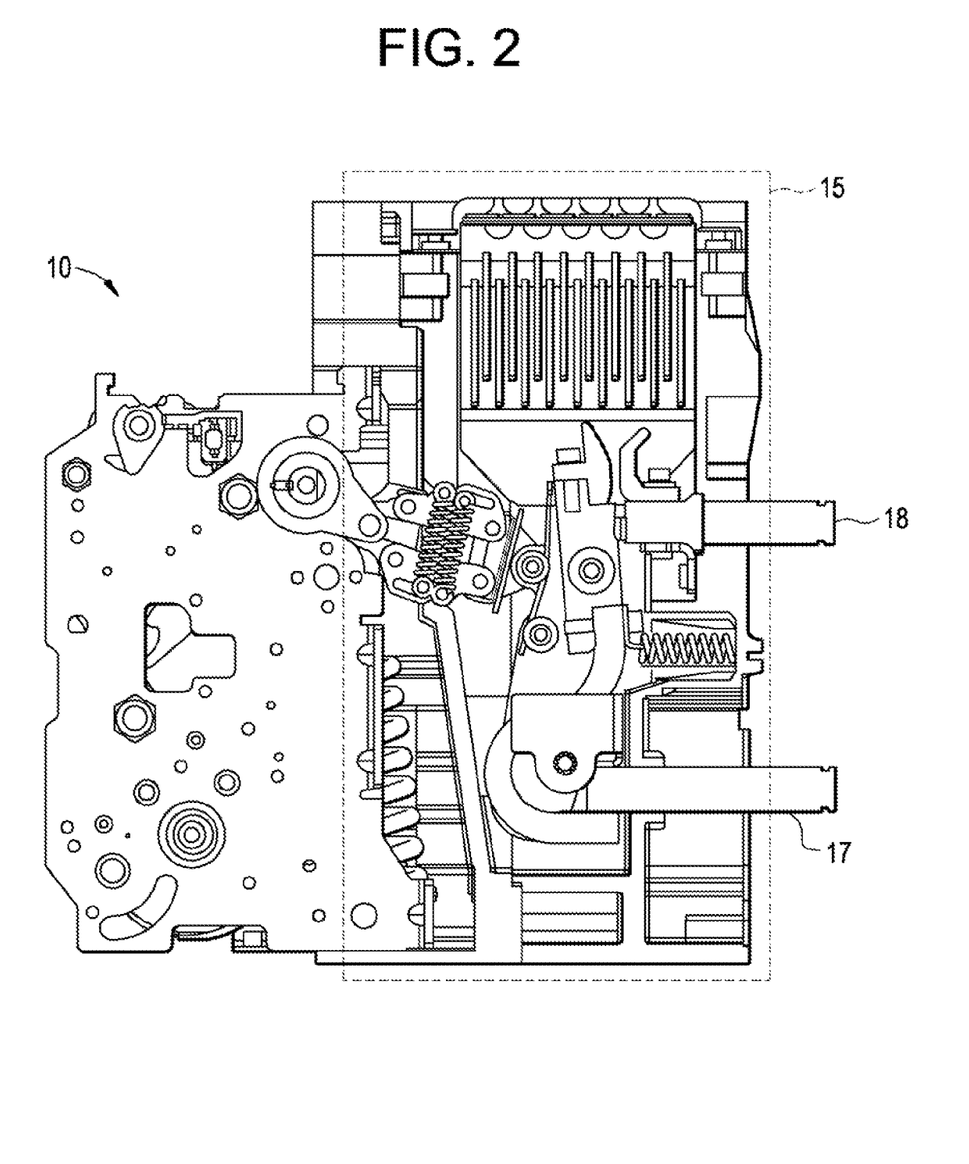
FIG. 2 is a side plan view of a circuit breaker in a closed position that can be implemented within embodiments of the present invention.

FIG. 2 is a right perspective view of the circuit breaker of FIG. 1. In FIG. 2, the draw out air circuit breaker 10 having a plurality of contacts configured for connecting and disconnecting an electrical power source to an electrical load. The circuit breaker 10 includes a plurality of conductors 17 and 18 which are connected to an electrical circuit (not shown). When in a draw out position, the circuit breaker 10 is on the draw out support plate 20 (depicted in FIG. 3) and is moved in and out of connection with the electrical circuit. The conductor 17 allows current to flow through the circuit breaker 10 and then the conductor 18 allows the current to be transmitted to the electrical circuit and load.

Figure 3:
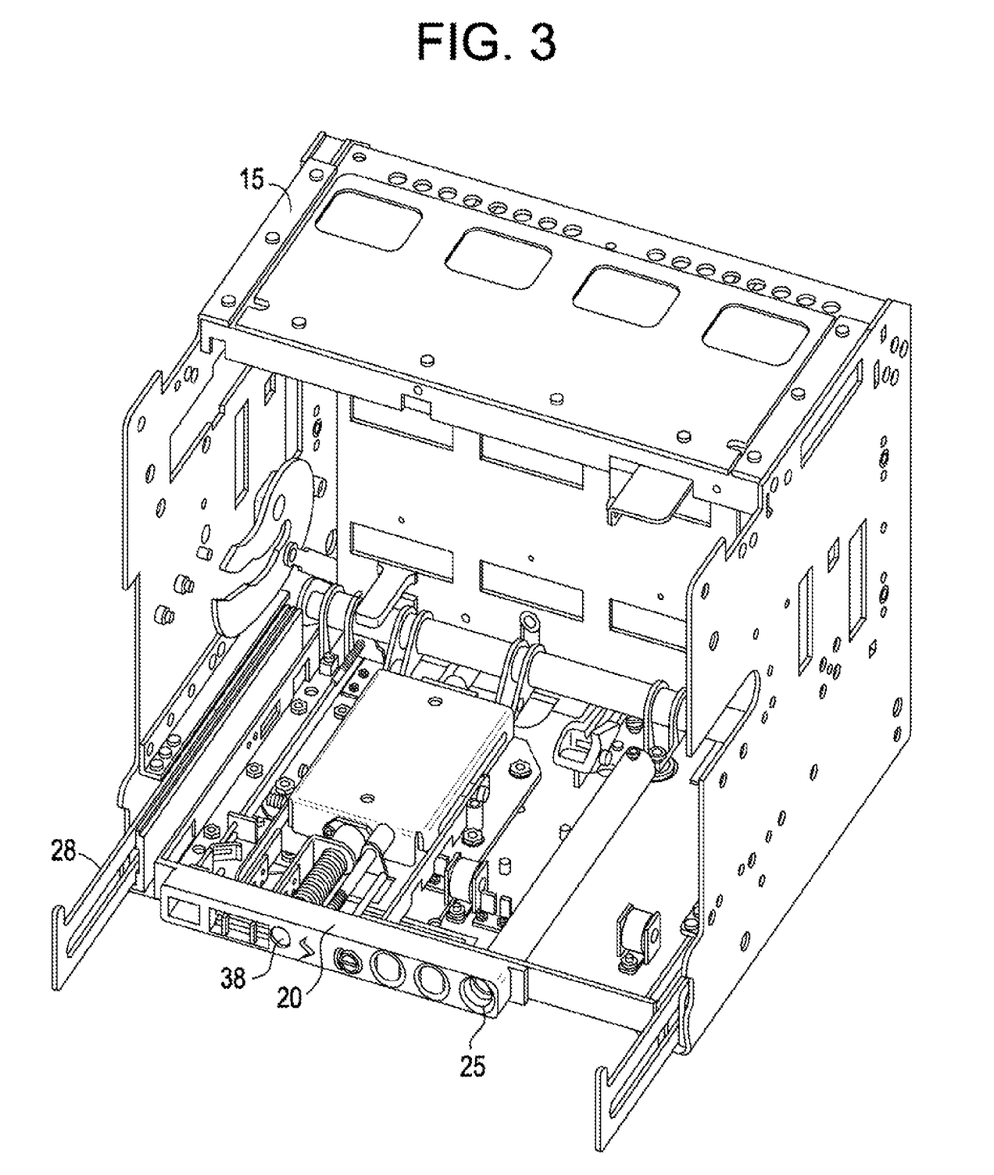
FIG. 3 is a perspective view of a breaker cassette of the draw out circuit breaker assembly of FIG. 1 that can be implemented within embodiments of the present invention.

FIG. 3 is a perspective view of the breaker cassette of the draw out circuit breaker assembly of FIG. 1 that can be implemented within embodiments of the present invention. As shown in FIG. 3, the breaker cassette 15 comprises a draw out support plate 20 housing operational components of the draw out air circuit breaker 10, and a port 25 disposed therein. A collapsible telescopic racking handle (depicted in FIG. 4, for example) is stored in the port 25 when the draw out air circuit breaker 10 is racked into the breaker cassette 15 via the support railings 28.

Figure 4:
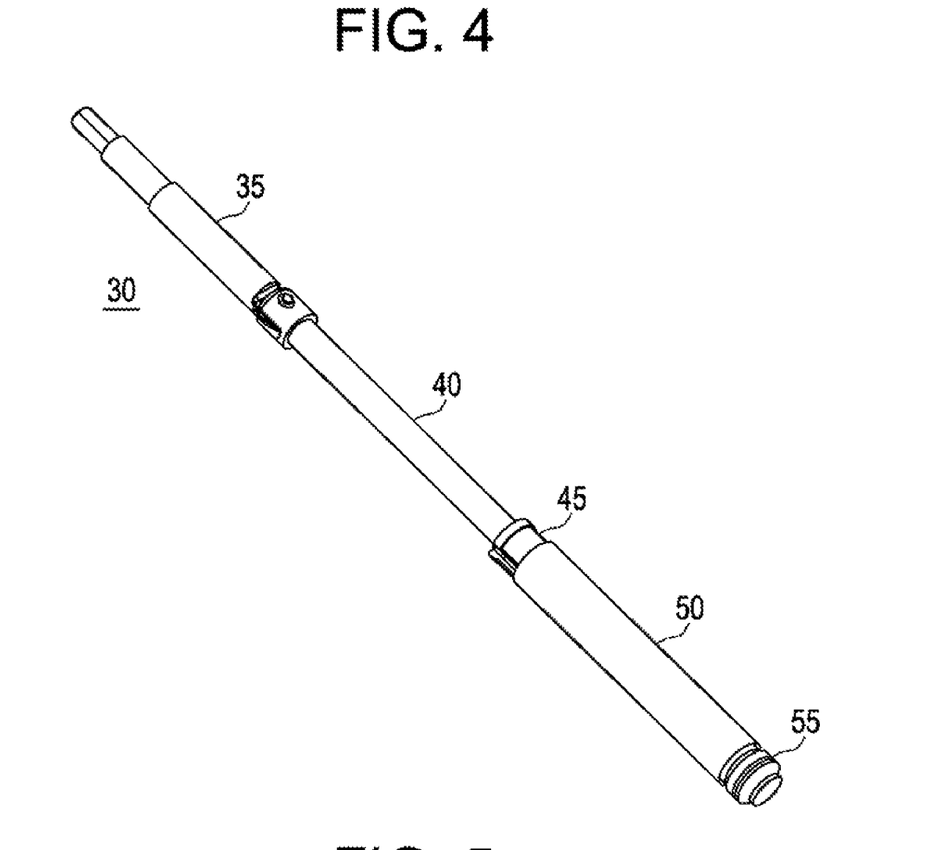
FIG. 4 is a detailed view of a telescopic racking handle that can be implemented within embodiments of the present invention.

FIG. 4 is a detailed view of a telescopic racking handle that can be implemented within embodiments of the present invention. In FIG. 4, a telescopic racking handle 30 comprises a racking shaft arm 35 configured to be engaged with a racking shaft 38 of the breaker cassette 15 when the draw out air circuit breaker 10 is racked into the breaker cassette 15. The telescopic racking handle 30 further comprises a mechanical arm 40 coupled to the racking shaft arm 35 to assist in racking the draw out air circuit breaker 10 into and out of the breaker cassette 15, and a telescopic arm having a gripping sleeve 45 and receiving the mechanical arm 40 therein when the telescopic racking handle 30 is collapsed for storage. The gripping sleeve 45 is gripped by a user to turn the telescopic racking handle 30 and rack the draw out air circuit breaker 10 in and out of the breaker cassette 15. According to an exemplary embodiment, the telescopic racking handle 30 further comprises a pulling grip 55 to pull the telescopic racking handle in order to remove the telescopic racking handle from the port 25 for usage.

Figure 5:
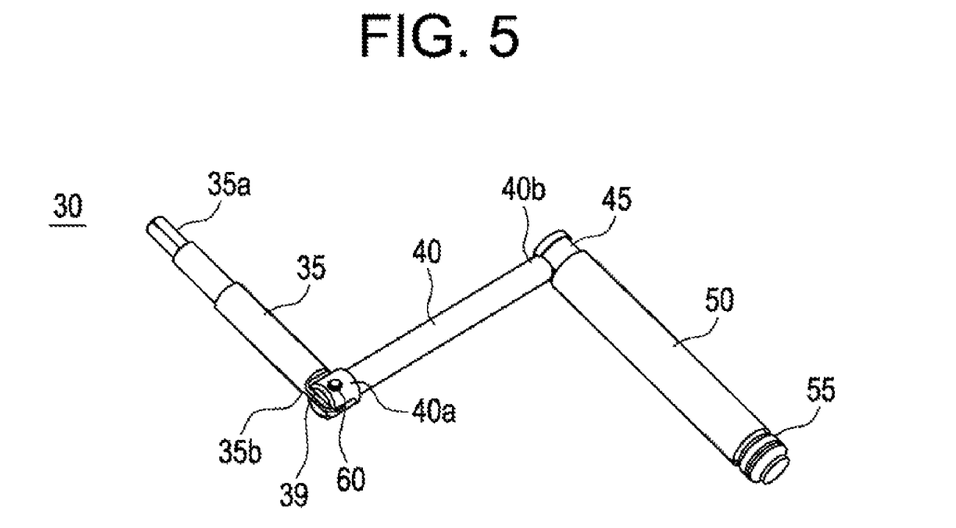
FIG. 5 is a perspective view of the telescopic racking handle of FIG. 4 that can be implemented within embodiments of the present invention.
Figure 6:
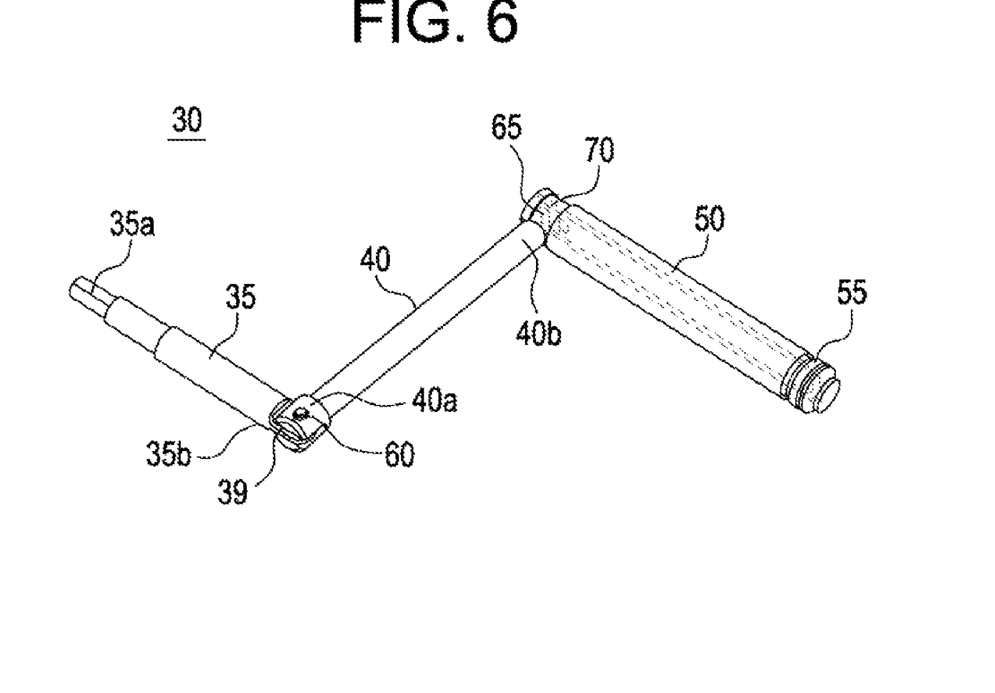
FIG. 6 is another perspective view of the telescopic racking handle of FIG. 4 that can be implemented within embodiments of the present invention.

According to an exemplary embodiment of the present invention, the telescopic racking handle 30 folds and locks into a Z-shape when removed from the port 25 and expanded through expansion of the telescopic sections (i.e., the mechanical arm 40 and telescopic arm 50), to rack the draw out air circuit breaker 10 into and out of the breaker cassette 15. FIGS. 5 and 6 are perspective views of the telescopic racking handle of FIG. 4 that can be implemented within embodiments of the present invention. As shown in FIGS. 5 and 6, the telescopic racking handle 30 is folded into a Z-shape. According to the current exemplary embodiment, the telescopic racking handle 30 is folded and locked into the Z-shape when removed from the port 25 to rack the draw out air circuit breaker 10 into the breaker cassette 15.

According to an exemplary embodiment, the racking shaft arm 35 comprises a first end 35a which engages with the racking shaft 38 (depicted in FIG. 3) of the breaker cassette 15, and a second end 35b which pivots and locks with the mechanical arm 40. According to an exemplary embodiment, the first end 35a of the racking shaft arm 35 includes a hexagonal profile which engages with a hexagonal recess in the racking shaft 38 of the breaker cassette 15, and the second end 35b includes a flat portion 39 which is pivoted and locked to the mechanical arm 40. The mechanical arm 40 comprises a spring loaded ball 60 disposed at a first end 40a of the mechanical arm 40 and coupled to the second end 35b of the racking shaft arm 35. The spring loaded ball 60 locks the racking shaft arm 35 in a 90° foldable position. Further, as shown in FIG. 4, a pin 65 is disposed in a groove 70 at a second end 40b of the mechanical arm 40 and acts as a guiding member for the telescopic arm 50. The second side 40b includes a flat surface and is coupled to the telescopic arm 50 and the gripping sleeve 45 via the pin 60. According to an exemplary embodiment, the second side 40b of the mechanical arm 40 may be welded to the telescopic arm 50 and the gripping sleeve 45 via the pin 65. Also, the pin 65 acts as a stopper and stops the telescopic arm 50 and gripping sleeve 45 when in a locked position and keeps the telescopic racking handle 30 stable in the Z-shaped position.

Further, as shown in FIGS. 5 and 6, according to the current exemplary embodiment, the mechanical arm 40 and the telescopic arm 50 are folded in a 90° foldable position in a direction orthogonal to the 90° foldable position between the racking shaft arm 35 and the mechanical arm 40.

When it is desired to rack the draw out air circuit breaker 10 in or out of the breaker cassette 15, the racking shaft arm 35 engages with the racking shaft of the breaker cassette 15 and the telescopic arm 50 and gripping sleeve 45 is gripped by the user. Then, the telescopic racking handle 30 is turned clockwise to rack the draw out air circuit breaker 10 inside the breaker cassette 15 and turned counterclockwise to draw the draw out air circuit breaker 10 out of the breaker cassette 15.

Figure 7:
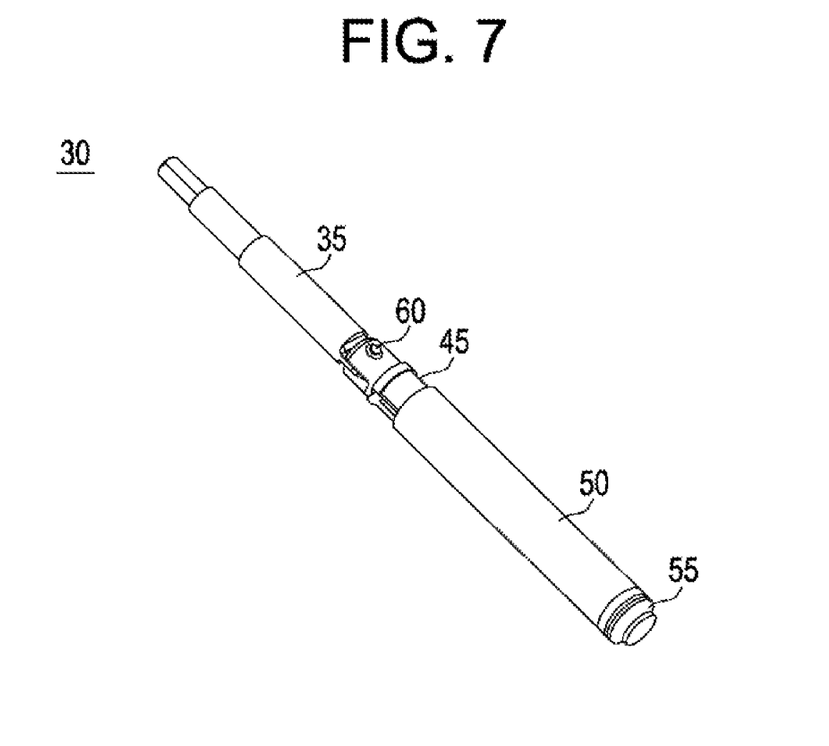
FIG. 7 is a perspective view of the telescopic racking handle in a collapsed state that can be implemented within embodiments of the present invention.

FIG. 7 is a perspective view illustrating the telescopic racking handle 30 of FIG. 4 in a collapsed state that can be implemented within embodiments of the present invention. According to an exemplary embodiment of the present invention, when storing the telescopic racking handle 30, the telescopic racking handle 30 is first collapsed from the Z-shape (shown in FIGS. 5 and 6) into an elongated position as shown in FIG. 7, by applying an external force. Then, the telescopic arm 50 is retracted in an umbrella-like manner such that the mechanical arm 40 is received therein. That is, as shown in FIG. 7, the telescopic racking handle 30 collapses coaxially at a connection between mechanical arm 40 and the telescopic arm 50 to insert the mechanical arm 40 into a tubular section of the telescopic arm 50.

According to an exemplary embodiment of the present invention, a length of the telescopic racking handle 30 when stored in the port 25 is smaller than a length of the telescopic racking handle 30 when racking the draw out circuit breaker 10 into the breaker cassette 15. That is, since the telescopic racking handle 30 is collapsible, the length thereof is reduced to enable the telescopic racking handle 30 to be easily stored in the port 25.

Figure 8:
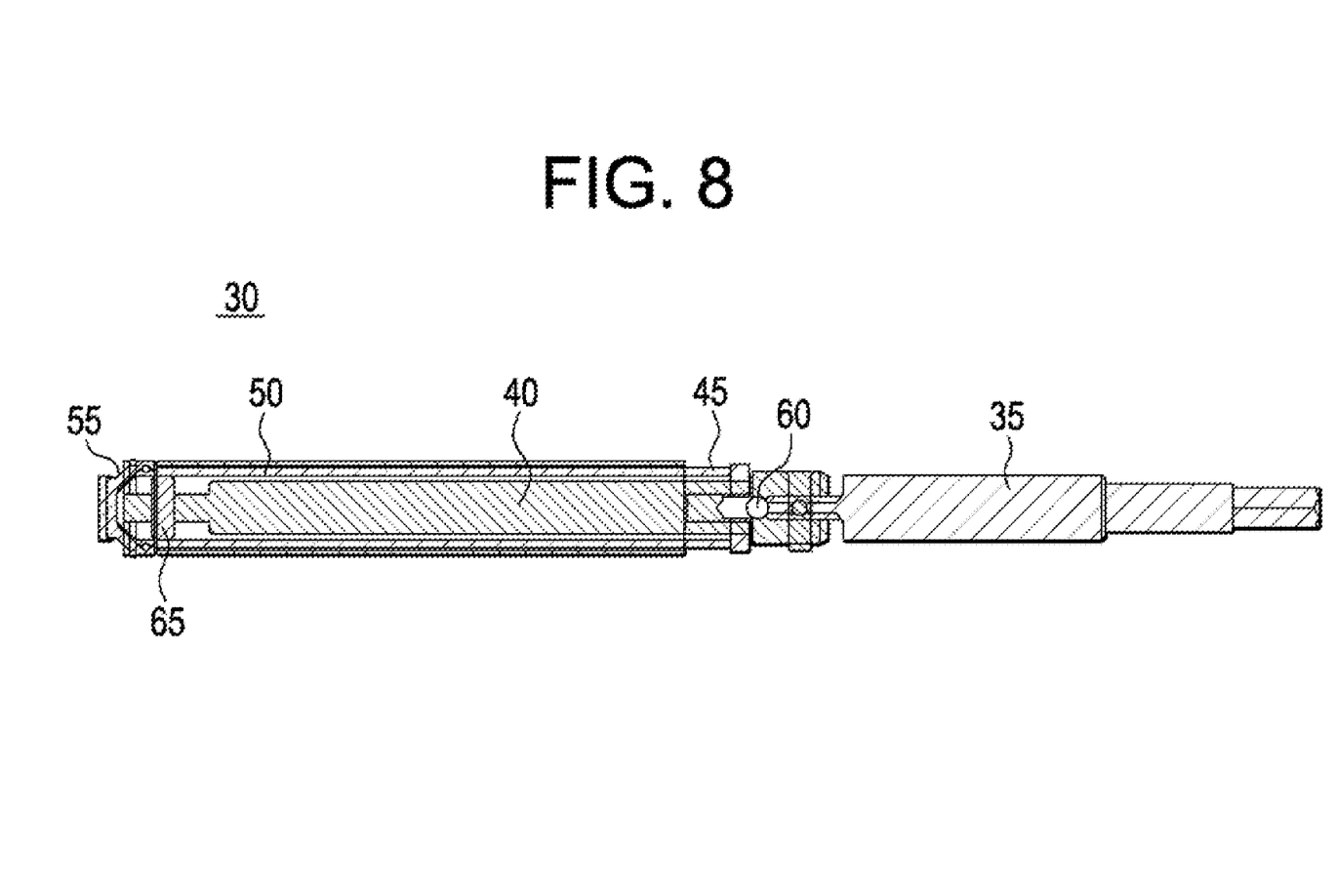
FIG. 8 is a cross-sectional view of the telescopic racking handle of FIG. 7 that can be implemented within embodiments of the present invention.

FIG. 8 is a cross-sectional view illustrating the telescopic racking handle 30 in the collapsed state shown in FIG. 7. As shown in FIG. 8, the mechanical arm 40 is positioned inside of the telescopic arm 50. When the telescopic racking handle 30 is to be utilized, the mechanical arm 40 is removed from the interior of the telescopic arm 50 by applying a force to slide the pin 65, and the telescopic racking handle 30 is folded into the Z-shape (see FIGS. 5 and 6) to rack the draw out air circuit breaker 10 into and out of the breaker cassette 15.

Figure 9:
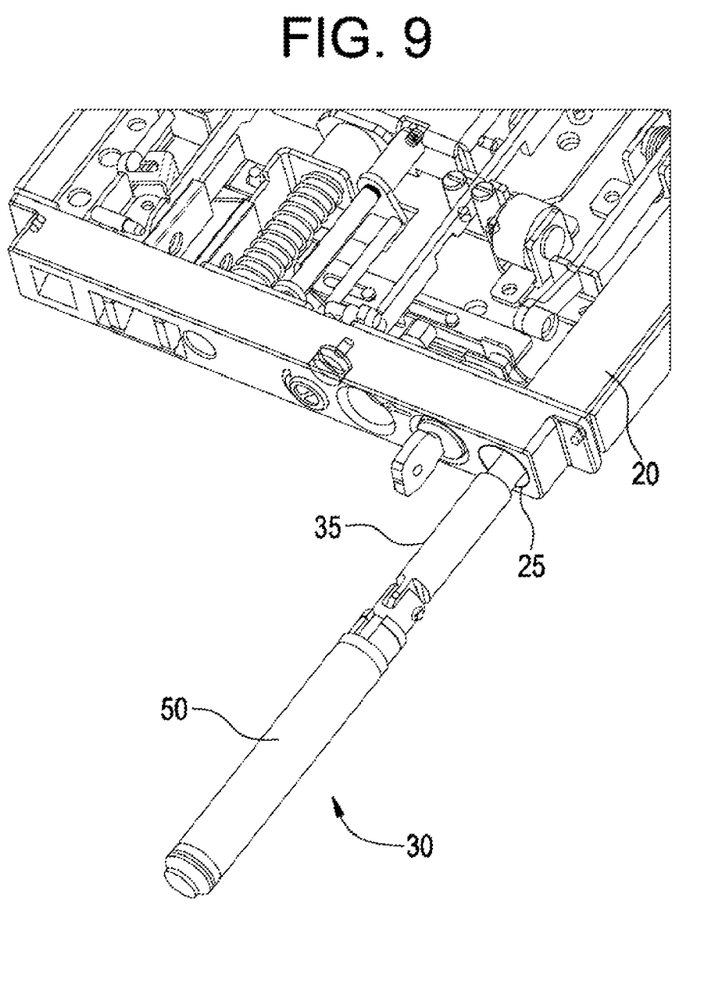
FIG. 9 is a perspective view of the telescopic racking handle being stored that can be implemented within embodiments of the present invention.

FIG. 9 is a perspective view illustrating the telescopic racking handle being stored that can be implemented within embodiments of the present invention. As shown in FIG. 9, the telescopic racking handle 30 in a collapsed state is inserted into the port 25 of the breaker cassette 15 for storage, after racking the draw out air circuit breaker 10 into the breaker cassette 15. The telescopic racking handle 30 is positioned such that the racking shaft arm 35 is first inserted into the port 25 followed by the telescopic arm 50.

Figure 10:
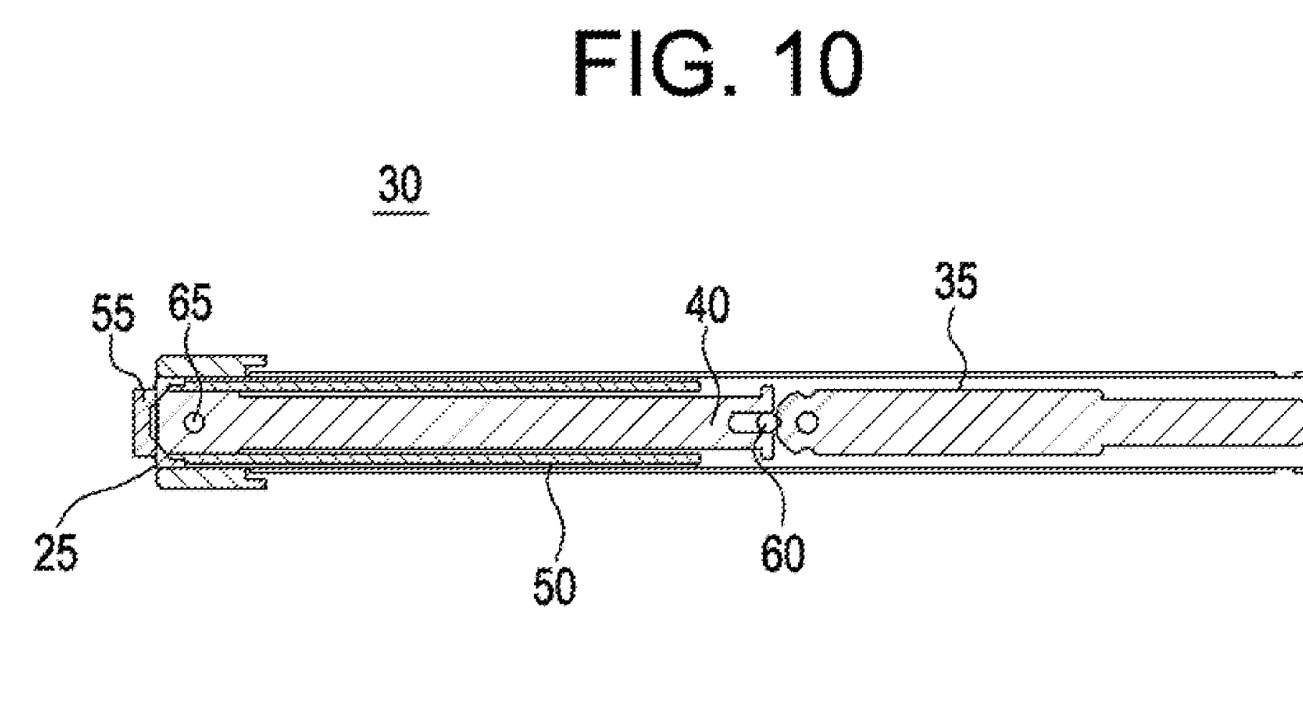
FIG. 10 is a perspective view of the telescopic racking handle in a stored position that can be implemented within embodiments of the present invention.

FIG. 10 is another perspective view illustrating the telescopic racking handle in a stored position that can be implemented within embodiments of the present invention. As shown in FIG. 10, the collapsed telescopic racking handle 30 is in a stored position inside of the port 25 of the breaker cassette 15.

Figure 11:
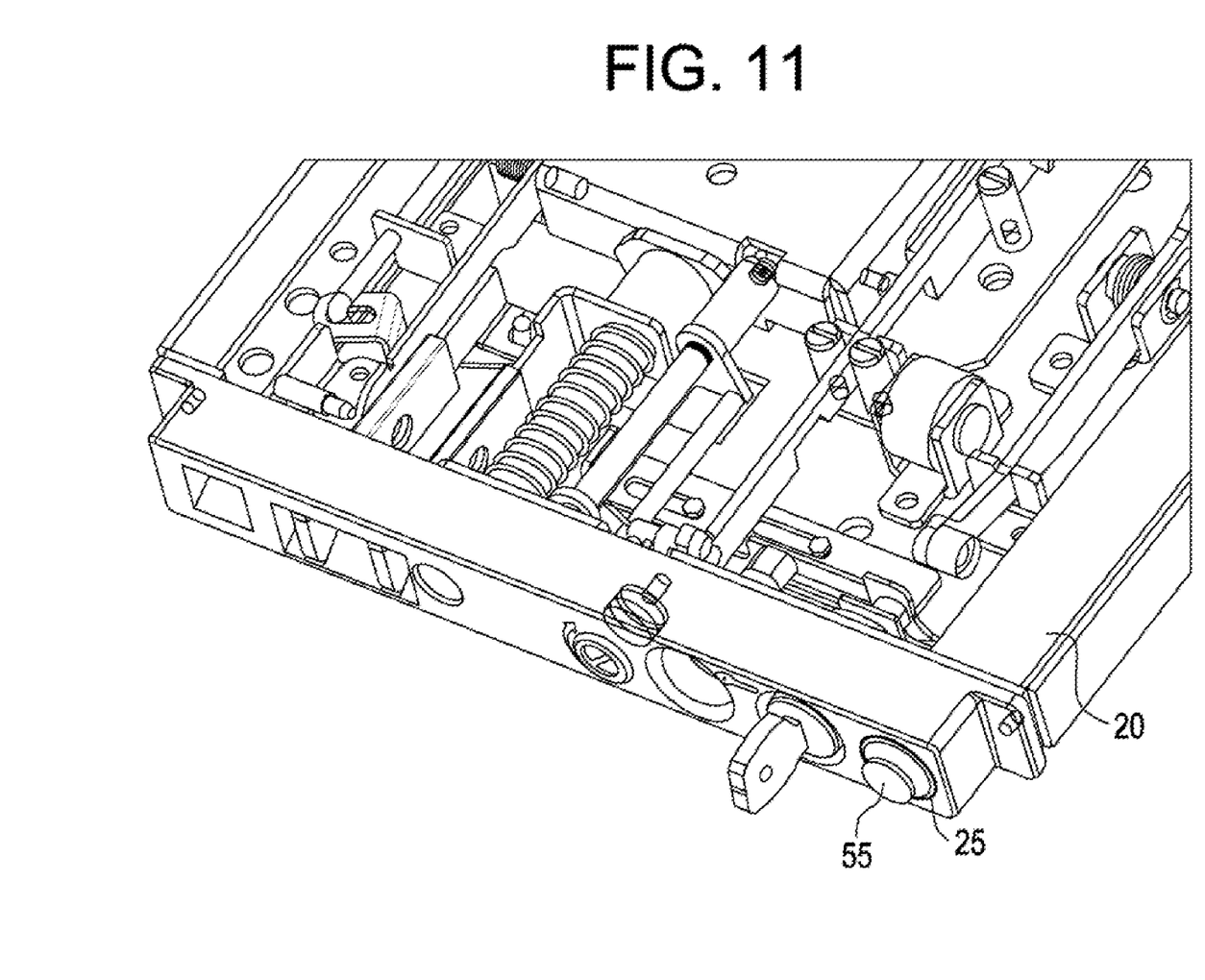
FIG. 11 is another perspective view of the telescopic racking handle in a stored position that can be implemented within embodiments of the present invention.

FIG. 11 is another perspective view illustrating the telescopic racking handle stored, that can be implemented within embodiments of the present invention. As shown in FIG. 11, the collapsed telescopic racking handle 30 is in a stored position inside the breaker cassette 15 and the pulling grip 55 remains outside the port 25 to enable a user to grip the telescopic racking handle 30 and pull it out of the breaker cassette 15 for usage.

According to an exemplary embodiment of the present invention the use of the telescopic arrangement to save space during storage without affecting the mechanical advantage and strength of the racking handle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A draw out circuit breaker assembly comprising:
   a draw out circuit breaker having a plurality of contacts configured for connecting and disconnecting an electrical power source to an electrical load;
   a breaker cassette comprising a draw out support plate housing operational components of the draw out circuit breaker, and a port; and
   a collapsible telescopic racking handle stored collapsed in the port after the draw out circuit breaker is racked into the breaker cassette.

2. The draw out circuit breaker assembly of claim 1, wherein the collapsible telescopic racking handle is foldable and lockable into a Z-shape when removed from the port to rack the draw out circuit breaker into the breaker cassette.

3. The draw out circuit breaker assembly of claim 1, wherein the collapsible telescopic racking handle comprises:
   a racking shaft arm configured to he engaged with a racking shaft of the breaker cassette when the draw out circuit breaker is racked into the breaker cassette;
   a mechanical arm coupled to the racking shaft arm to assist in racking the draw out circuit breaker into and out of the breaker cassette; and
   a telescopic arm which receives the mechanical arm therein.

4. The draw out circuit breaker assembly of claim 3, wherein the collapsible telescopic racking handle further comprises:
   a gripping sleeve configured to be gripped by a user to turn the collapsible telescopic racking handle and rack the draw out circuit breaker in and out of the breaker cassette; and
   a pulling grip to pull the collapsible telescopic racking handle in order to remove the collapsible telescopic racking handle from the port for usage.

5. The draw out circuit breaker assembly of claim 3, wherein the racking shaft arm comprises:
   a first end which engages with the racking shaft of the breaker cassette; and
   a second end which pivots and locks with the mechanical arm.

6. The draw out circuit breaker assembly of claim 5, wherein the mechanical arm comprises:
   a spring loaded ball disposed at a first end of the mechanical arm and coupled to the racking shaft arm and which locks the racking shaft arm in a 90° foldable position between the racking shaft arm and the mechanical arm; and
   a pin disposed in a groove at a second end of the mechanical arm having a flat surface, and is coupled to the telescopic arm and the gripping sleeve via the pin, the pin stopping the telescopic arm and gripping sleeve when the telescopic arm is in a locked position.

7. The draw out circuit breaker assembly of claim 6, wherein the mechanical arm and the telescopic arm are folded in a 90° foldable position in a direction orthogonal to the 90° foldable position between the racking shaft arm and the mechanical arm.

8. The draw out circuit breaker assembly of claim 7, wherein when the racking shaft arm engages with the racking shaft of the breaker cassette and the telescopic arm and gripping sleeve is gripped by the user, the collapsible telescopic racking handle is turnable clockwise to rack the draw out circuit breaker into the breaker cassette and turnable counter-clockwise to draw the draw out circuit breaker out of the breaker cassette.

9. The draw out circuit breaker assembly of claim 6, wherein when the collapsible telescopic racking handle is removed for usage, the mechanical arm is removed from an interior of the telescopic arm by applying a force to slide the pin, and the collapsible telescopic racking handle is folded into the Z-shape to rack the draw out circuit breaker into and out of the breaker cassette.

10. The draw out circuit breaker assembly of claim 9, wherein when storing the collapsible telescopic racking handle, the collapsible telescopic racking handle is collapsed from the Z-shape into an elongated position by applying an external force and the telescopic arm is retracted such that the mechanical arm is received therein.

11. The draw out circuit breaker assembly of claim 1, wherein a length of the collapsible telescopic racking handle when stored in the port is smaller than a length of the collapsible telescopic racking handle when racking the draw out circuit breaker into the breaker cassette.

12. A method for racking a draw out circuit breaker into and out of a breaker cassette, the method comprising:
   folding a collapsible telescopic racking handle into a Z-shape;
   engaging a racking shaft arm of the collapsible telescopic racking handle with a racking shaft of the breaker cassette;
   racking the draw out circuit breaker into and out of the breaker cassette; and
   collapsing the collapsible telescopic racking handle for storage thereof in a port in the breaker cassette; and
   extending the collapsible telescopic racking handle into an elongated position.

13. The method of claim 12, wherein folding the collapsible telescopic racking handle comprises:
   folding the collapsible telescopic racking handle in a 90° foldable position at both ends thereof and locking the collapsible telescopic racking handle in the Z-shape for usage in racking the draw out circuit breaker into and out of the breaker cassette.

14. The method of claim 12, wherein racking the draw out circuit breaker comprises:
   turning the collapsible telescopic racking handle clockwise to rack the draw out circuit breaker into the breaker cassette; and
   turning the collapsible telescopic racking handle counter-clockwise to draw the draw out circuit breaker out of the breaker cassette.

15. The method of claim 12, wherein collapsing the collapsible telescopic racking handle comprises:
   collapsing a first portion of the collapsible telescopic racking handle into a second portion of the collapsible telescopic racking handle to shorten a length of the collapsible telescopic racking handle for storage in the port.

* * * * *

UNITED STATES PATENT AND TRADEMARK OFFICE
CERTIFICATE OF CORRECTION

| | | |
|---|---|---|
| PATENT NO. | : 7,834,281 B2 | Page 1 of 1 |
| APPLICATION NO. | : 12/103077 | |
| DATED | : November 16, 2010 | |
| INVENTOR(S) | : Narayanan et al. | |

It is certified that error appears in the above-identified patent and that said Letters Patent is hereby corrected as shown below:

In Column 5, Line 26, in Claim 3, delete "to he" and insert -- to be --, therefor.

Signed and Sealed this
Third Day of April, 2012

David J. Kappos
*Director of the United States Patent and Trademark Office*